(No Model.) 2 Sheets—Sheet 1.
J. H. WHITE & T. S. BARKER.
INSECT DESTROYER.
No. 600,106. Patented Mar. 1, 1898.
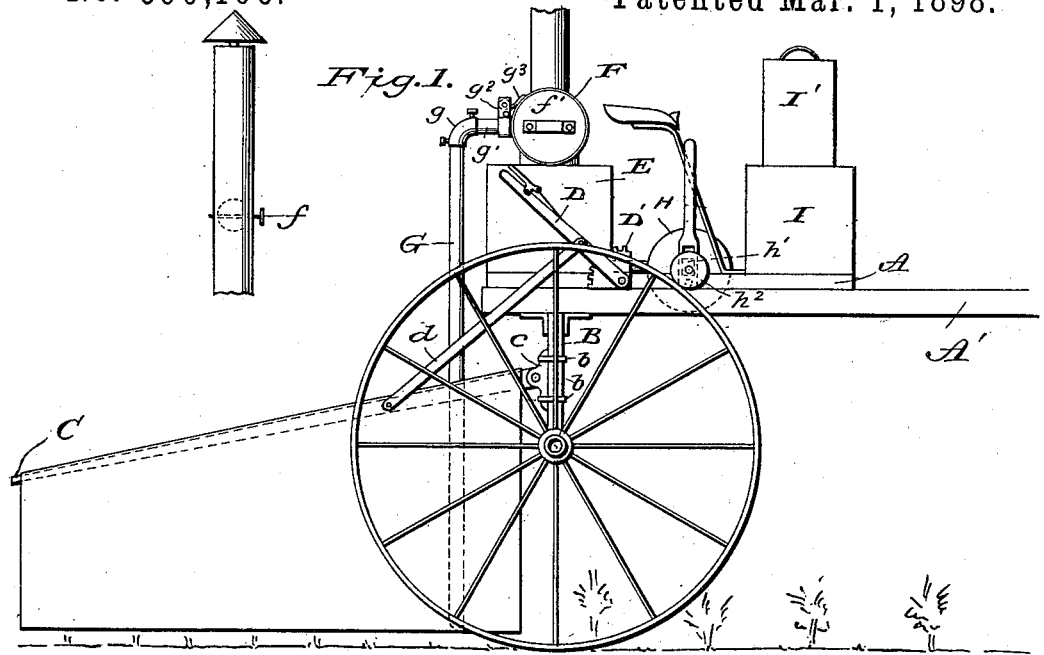
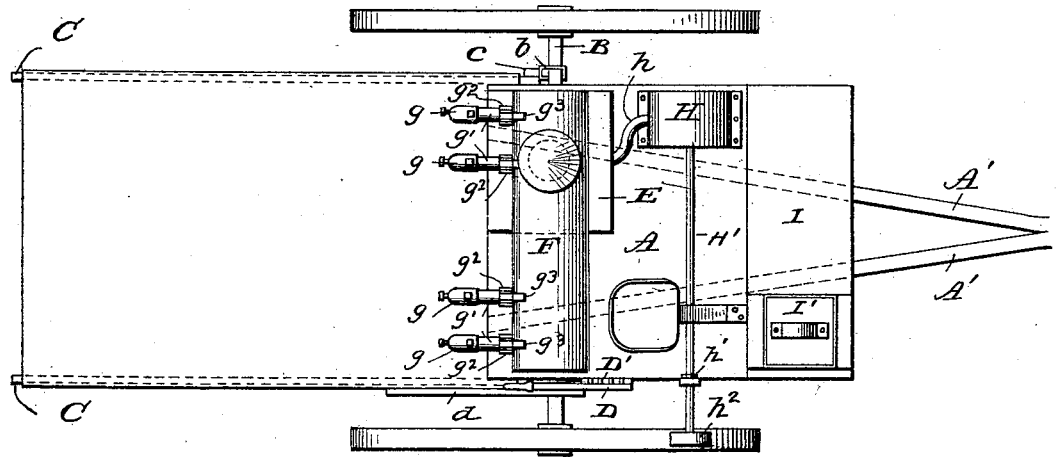
WITNESSES:
L. S. Elliott.
H. H. Johnson.
Joshua H. White
and
Thomas S. Barker
INVENTORS:
Eugene W. Johnson
Attorney.

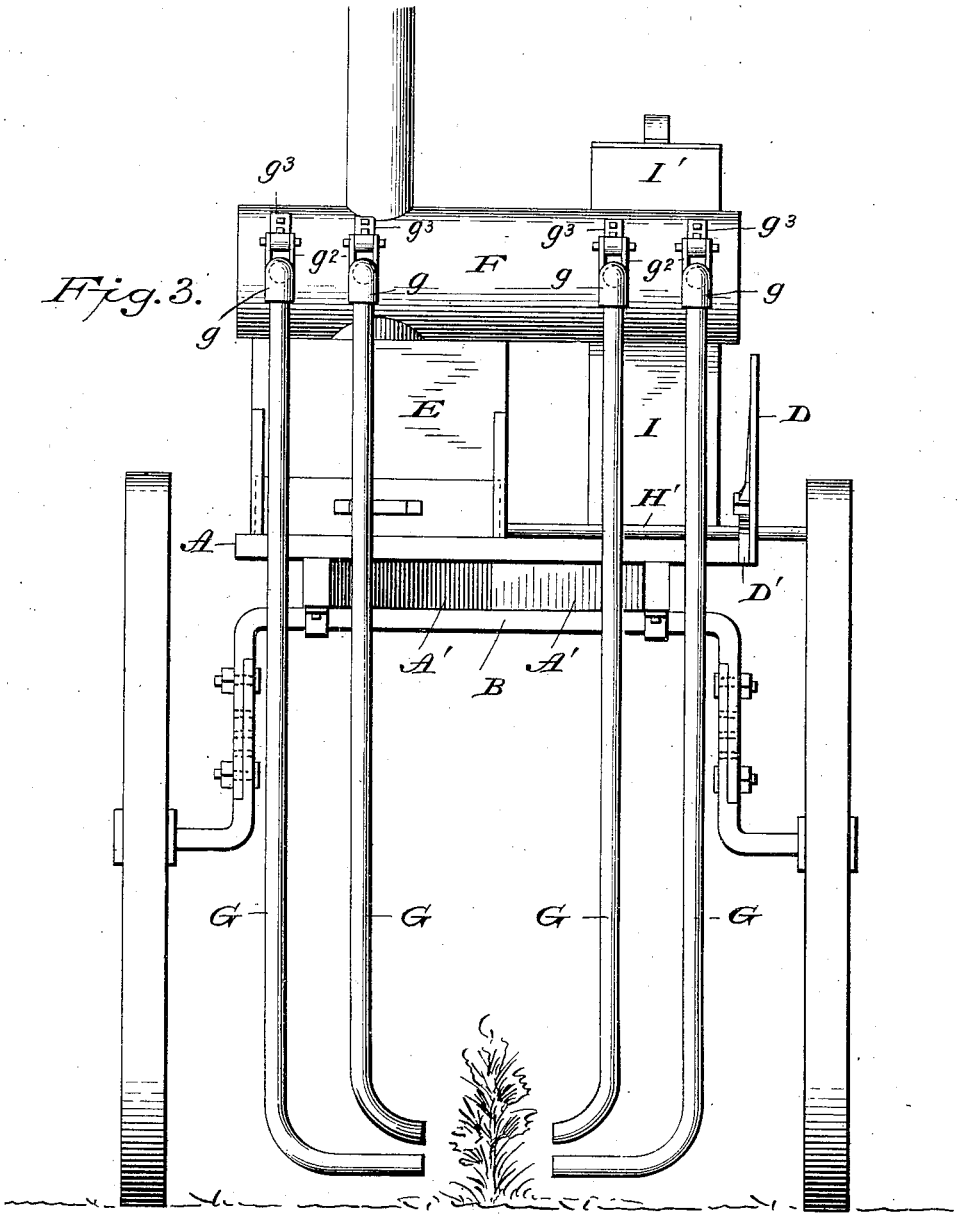

UNITED STATES PATENT OFFICE.

JOSHUA H. WHITE AND THOMAS S. BARKER, OF YARNABY, INDIAN TERRITORY.

INSECT-DESTROYER.

SPECIFICATION forming part of Letters Patent No. 600,106, dated March 1, 1898.

Application filed August 10, 1897. Serial No. 647,736. (No model.)

*To all whom it may concern:*

Be it known that we, JOSHUA H. WHITE and THOMAS S. BARKER, citizens of the United States of America, residing at Yarnaby, in the Chickasaw Nation, Indian Territory, have invented certain new and useful Improvements in Insect-Destroyers; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain new and useful improvements in fumigators for destroying insects, the object of the improvement being to provide a cheap, simple, and effective machine for killing and destroying insects upon growing plants; and with the above object in view the invention consists of a machine comprising a frame having a draft-tongue, upon which frame is mounted a furnace, means for collecting the fumes therefrom, and a blower for creating a current of air through the furnace, so that said air will be impregnated with the products of combustion and discharged upon or adjacent to the growing plants. The frame also carries a fuel-box and water-tank, so that the fuel may be dampened before being fed to the furnace.

The invention further consists in providing this class of device with an arched axle, which is adjustable vertically, so that the ends of the discharge-tubes may be positioned at a desired distance above the ground, the vertical portions of the arched axle also carrying a supporting-frame for a canvas hood, said frame being adjustably secured to the axle and is also provided with means for raising and lowering the same.

In the accompanying drawings, which illustrate our invention, Figure 1 is a side elevation of an insect-destroyer constructed in accordance with our improvement. Fig. 2 is a plan view; and Fig. 3 is a rear elevation, the frame which supports the canvas hood or cover being removed.

A refers to a suitable platform, to which are attached hounds A', which carry the draft-tongues, said hounds being attached to the platform and to the arched axle B in any suitable manner. The axle B has its vertical members divided and is provided with suitable connecting-bolts, so that the height of the frame may be varied, and the sections of the vertical members of the arched frame are further connected to each other by clips $b$, which also serve to retain in place bearing-blocks $c$, to which are pivotally connected arms C, which serve as a support for a canvas hood or cover consisting of top and depending side pieces. The rearwardly-extending arms C are connected to each other by suitable transverse braces, and to one of the arms, preferably the one on the right-hand side of the machine, is attached a link $d$, the upper end of said link being connected to a lever D, which is pivotally attached to a rack-segment D', secured to the frame A, the parts being so organized that when the lever is moved forwardly the arms will be raised to elevate the canvas cover.

The supporting-wheels are attached to the arched axle in the usual manner.

E refers to a suitably-constructed furnace or stove, which is mounted upon the platform A, and this stove or furnace is connected with a smoke drum or chamber F, so that the products of combustion from the stove or furnace will pass into the chamber F and may be conducted therefrom either to a chimney or smoke-stack, which is provided with a damper $f$, or to a series of tubes, preferably four in number, which are connected to the chamber F and depend therefrom, the lower ends being bent, as shown at Fig. 3, so that the products of combustion will be discharged toward the plants. The smoke drum or chamber F is provided at one end with a closure or cap $f'$, which can be readily removed for cleaning the drum, and the stove or furnace is provided with a suitable door through which the same is supplied with fuel.

The tubes G, through which the products of combustion pass prior to being discharged upon the growing plants, are provided with an elbow-coupling $g$, which will permit the vertical members of the tubes G to be turned at a suitable or desired angle, and further movement of these tubes after being adjusted can be prevented by means of set-screws.

This coupling also provides for a swinging or lateral adjustment of the vertical members of the tube upon the horizontal sections $g'$, which are rigidly attached to the smoke drum or chamber by means of a clamp $g^2$, which encircles the short pipes $g'$, said coupling being riveted to the smoke drum or chamber by an ear or lug $g^3$. When it is desired to change the vertical elevation of the tubes G, it is accomplished by adjusting the vertical members of the arched axle, said adjustment changing the height of the platform.

Connected with the furnace is a blower H of the fan type, the connection with the casing thereof being through a way or tube $h$, which leads from the casing to the furnace beneath the grate thereof. The fan, which is located within the casing, is mounted on a shaft H', and said shaft is supported on the side of the frame opposite the casing by a bearing $h'$, which has a vertical slot, which will permit the shaft to be raised and lowered for the purpose of placing the driving-wheel $h^2$ in and out of engagement with the periphery or tire of one of the supporting-wheels, said adjustment also being desirable, as the position of the wheel with respect to the pulley or driving-wheel $h^2$ may be changed. The shaft H' can pass through a lever having a longitudinal slot to effect an adjustment of the driving-wheel $h^2$, and when the supporting-wheel is raised or the platform lowered this lever will be inclined forwardly, moving horizontally the shaft H', and when the platform is raised the lever is moved rearwardly, which will change the position of the driving-wheel $h^2$ and bring it to a different position with respect to the periphery of the supporting-wheel. If desirable, the shaft H' may be flexible or it may be provided with a universal coupling.

Upon the forward portion of the frame is mounted a fuel-box, and above said fuel-box I is a water-tank I', and said water-tank may be connected with the fuel-box, so that the fuel can be dampened, so as to give greater effect as to the destruction of animal life to the products of combustion generated from the fuel.

In practice the fuel may be sulfur or hard coal mixed with any suitable material which will destroy insects, and it is fed into the furnace, the products of combustion being driven by the blast generated by the fan into the smoke drum or chamber, where it is cooled to such an extent that it will not destroy vegetable life and is discharged through the pipes G upon the growing plants, and as the machine is drawn across the field the horses will walk on each side of a row of plants, the hood or canvas cover preventing the wind blowing the products of combustion away and retaining the same beneath the hood as the machine travels across the field.

We are aware that prior to our invention it has been proposed to provide an insect-destroying machine with a stove connected with a blower and pipes for leading the gases or products of combustion to the ground beneath an apron or cover, and we do not claim such invention broadly; but

What we claim as new, and desire to secure by Letters Patent, is—

1. In a machine for destroying insects, the combination of a wheel-supported frame having a furnace, a smoke-drum or cooling-chamber, a plurality of pipes connected to said smoke-drum so as to depend from opposite sides of the frame the discharge ends of the pipes being bent or curved so as to project toward the center of the supporting-frame, substantially as shown and for the purpose set forth.

2. In a machine for destroying insects, a frame mounted on an arched axle, said axle having adjustable side members, of a smoke-generating device mounted on the frame, a plurality of rigid discharge-pipes connected to each end of the smoke drum or chamber so as to depend therefrom, said pipes having bent ends positioned on different vertical planes for discharging the products of combustion toward a central point, and a hood or apron carried by the frame, the parts being organized substantially as shown and for the purpose set forth.

3. In an insect-destroying machine, the combination of a frame mounted upon a vertically-adjustable arched axle, a furnace, a smoke-drum having discharge-pipes positioned substantially as shown, a blower connected with the furnace and provided with a shaft having a driving-wheel for engagement with the periphery of one of the supporting-wheels and means for changing the position of the shaft and driving-wheel with respect to one of the supporting-wheels and frame, substantially as shown and for the purpose set forth.

4. In an insect-destroying machine the combination of an arched axle the depending members of which are adjustable, of a smoke drum or chamber mounted on the frame supported by the arched axle, discharge-pipes G, arranged in pairs and provided with bent discharge ends, of a coupling adapted to permit a turning and a swinging adjustment of the pipes, substantially as shown.

5. In an insect-destroying machine, the combination of a frame mounted on an arched axle having the vertical members thereof extensible, arms C, adjustably connected to the vertical members of the axle, an apron or cover supported by said arms so as to provide a top portion and depending side pieces, a link connecting one of the side arms with a lever, means for connecting the lever with the frame, substantially as shown and for the purpose set forth.

6. In an insect-destroying machine having a frame supported by an arched axle, the side members of which are vertically adjustable, a blower and smoke-generating device mounted on said frame and tubes for discharging the products of combustion adjacent to the ground, the shaft of the fan or blower H' passing through a support or lever, said support or lever being pivoted to the supporting-frame and provided above said pivot with a slot through which the shaft passes and a driving-wheel mounted on the end of the shaft for engagement with the periphery of one of the supporting-wheels, substantially as shown whereby the position of the driving-wheel can be varied for the purpose set forth.

In testimony whereof we affix our signatures in presence of two witnesses.

JOSHUA H. WHITE.
    THOMAS S. BARKER.

Witnesses:
 WILLIAM ANDERSON,
 JOHN R. HOPKINS.